United States Patent [19]

Kruger

[11] Patent Number: 5,095,853

[45] Date of Patent: Mar. 17, 1992

[54] VACUUM CLEANED PET COMB

[76] Inventor: Jean J. Kruger, 120 Fort Salonga Rd., Fort Salonga, N.Y. 11768

[21] Appl. No.: 745,732

[22] Filed: Aug. 16, 1991

[51] Int. Cl.$^5$ ............................................. A01K 13/00
[52] U.S. Cl. ...................................................... 119/85
[58] Field of Search ................. 119/83, 85, 87, 88, 119/159; 132/212, 271, 219, 148, 152, 112, 116

[56] References Cited

U.S. PATENT DOCUMENTS

| | | | |
|---|---|---|---|
| D. 240,435 | 7/1976 | Remijas | D30/158 |
| D. 244,712 | 6/1977 | Houston | D30/159 |
| D. 307,067 | 4/1990 | Kohl | 15/344 |
| 1,878,345 | 9/1932 | Suter | 15/367 |
| 2,780,829 | 2/1957 | Cohen | 15/402 |
| 2,953,808 | 9/1960 | Carmack | 15/402 |
| 3,308,500 | 3/1967 | Woodruff | 119/85 |
| 3,574,885 | 4/1971 | Jones | 15/393 |
| 3,626,546 | 12/1971 | Dove | 119/85 X |
| 3,668,736 | 6/1972 | Loscalzo | 15/407 |
| 3,696,818 | 10/1972 | Weber | 132/116 X |
| 3,939,850 | 2/1976 | Wahl | 132/148 |
| 4,190,924 | 3/1980 | Nicholson | 119/83 |
| 4,471,791 | 9/1984 | DeRoche | 132/271 |
| 4,721,121 | 1/1988 | Adams | 132/212 |
| 4,779,572 | 10/1988 | Freulon | 119/85 |
| 4,799,460 | 1/1989 | Kohl | 119/85 |

FOREIGN PATENT DOCUMENTS 2320711  3/1977  France ................... 132/271

*Primary Examiner*—Gene Mancene
*Assistant Examiner*—Thomas Price
*Attorney, Agent, or Firm*—Leonard Belkin

[57] ABSTRACT

Vacuum cleaning animal grooming apparatus comprising a source of a vacuum, a generally cylindrically shaped tool open at its proximal end for engagement to the vacuum source, and the distal end of the tool being closed. The tool is flattened for a distance from the closed distal end and a slotted opening extends from the closed distal end along the flattened portion of the tool adjacent the outer periphery of the tool. An extended comb having a base from which teeth extend is supported at its base by a groove formed in the flattened portion with the teeth extending across the slotted opening.

5 Claims, 2 Drawing Sheets

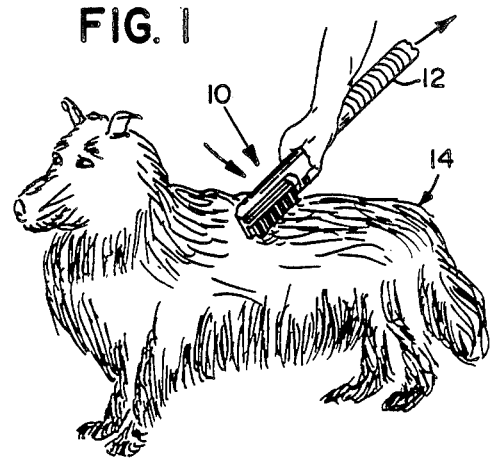
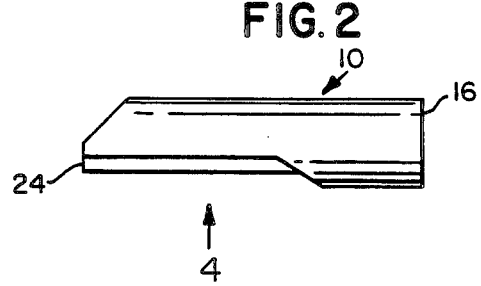
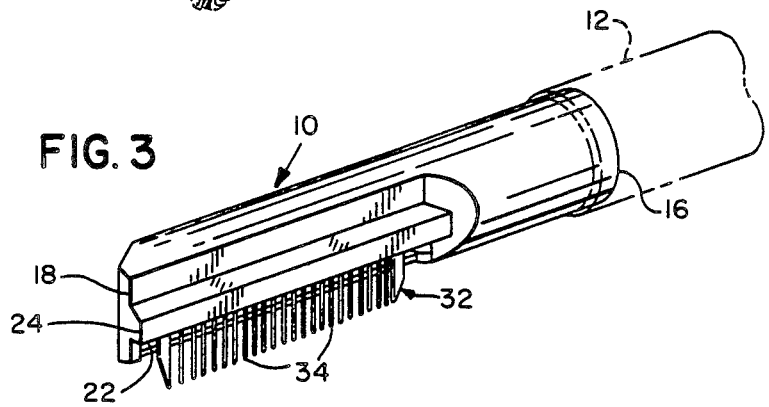
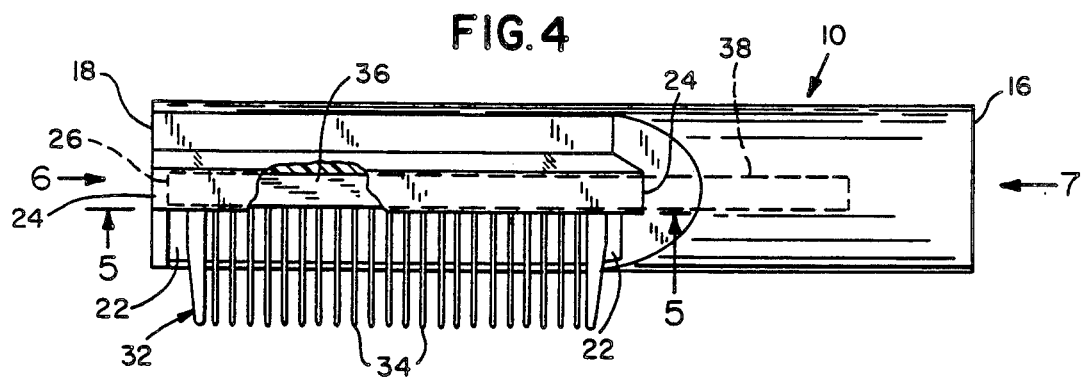

VACUUM CLEANED PET COMB

BACKGROUND OF THE INVENTION

The present invention relates to a grooming tool and more particularly to a grooming tool which is vacuum cleaned while in use.

When a comb is employed to groom the hair of a pet such as a dog or a cat there will be an accumulation of loose hair some of which will be on the comb and some in the surrounding area.

Many attempts have been made over the years to deal with this problem, and devices presently in use or proposed are usually complicated and therefore expensive, or else are inefficient or ineffective. Some of these devices are reflected in the following United States Patents.

U.S. Pat. No. 1,878,345 discloses a grooming tool connected to a vacuum cleaner which includes a scraping device.

U.S. Pat. No. 2,780,829 shows a vacuum currycomb device with teeth surrounding the outside of a head.

U.S. Pat. No. 2,953,808 describes a vacuum type loose hair remover with teeth surrounding a nozzle opening.

U.S. Pat. No. 3,574,885 discloses a pet brush with teeth surrounding an opening in a base member.

U.S. Pat. No. 3,668,736 shows a grooming and cleaning device with a currycomb projecting from a head.

U.S. Pat. No. 4,190,924 describes an animal grooming device with a toothed skirt surrounding a nozzle opening.

U.S. Pat. No. 4,799,460 teaches a portable vacuum cleaner for pets with teeth surrounding an opening.

Design patents 240,435, 244,712 and 307,067 show pet brushes or combs.

None of the preceding patents teaches the present invention.

SUMMARY OF THE INVENTION

This invention overcomes the disadvantages and drawbacks of now existing vacuum operated grooming combs for pets by providing an attachment to a vacuum hose having an easily replaceable comb.

A preferred embodiment of this invention comprises a tubular head for attachment to a vacuum hose having a slotted opening adjacent the end thereof. Inside the opening is an extended clip for supporting the base of a comb arranged so that the teeth cross the opening and about half the length of the teeth extend out of the tubular head. The comb is easily replaceable so that combs of different degrees of coarseness and fineness many be readily substituted. Each comb is provided with a tail extending into and down the length of the tubular head.

It is thus a principal object of this invention to provide an improved vacuum operated grooming tool for a pet.

Other objects and advantages of this invention will hereinafter become obvious from the following description of preferred embodiments of this invention.

BRIEF DESCRIPTION OF THE DRAWINGS

FIG. 1 is a perspective view of a tool embodying the principles of this invention being employed to groom a dog.

FIG. 2 is a top view of the tool.

FIG. 3 is a perspective view of the tool showing the comb in place.

FIG. 4 is a view looking at the tool from the direction indicated as 4 in FIG. 2 partially broken away.

DESCRIPTION OF THE PREFERRED EMBODIMENTS

As seen in FIG. 1, a grooming tool 10 embodying the principles of this invention would be attached to the end of a vacuum hose 12 for use in combing a pet such as a dog 14. Any hair coming loose from the animal during this grooming procedure will be drawn away through vacuum hose 12. It is understood that hose 12 can be part of a vacuum cleaner connected in conventional manner to a source of electric power or can be part of a portable vacuum cleaning device.

Figure 5:
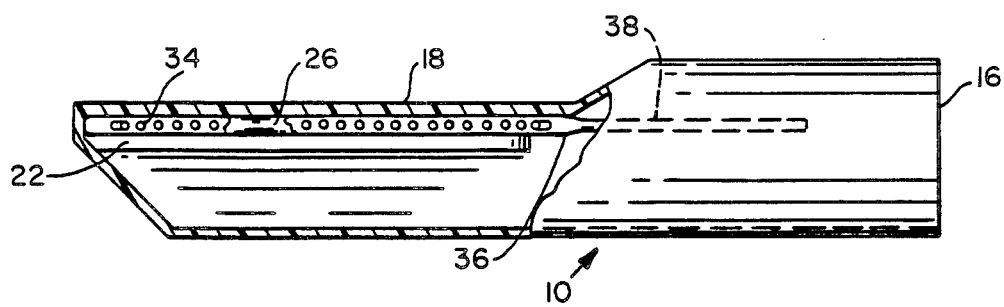
FIG. 5 is a section view taken along 5—5 of FIG. 4.
Figure 6:
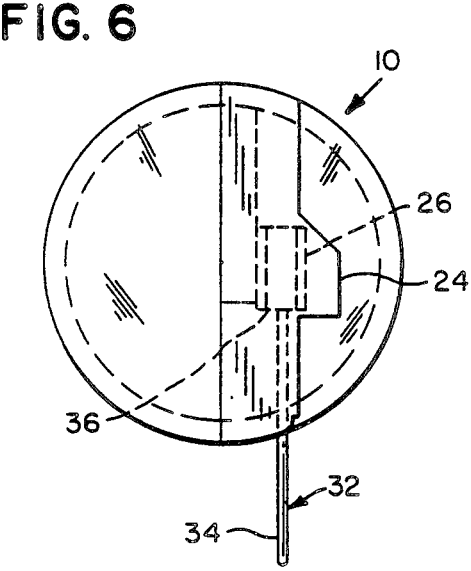
FIG. 6 is a view from the left side in the direction of 6 from FIG. 4.
Figure 7:
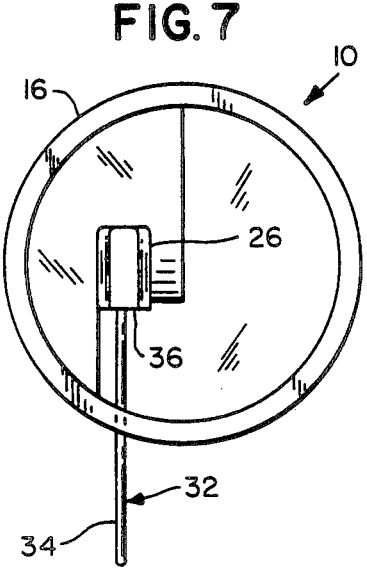
FIG. 7 is a view from the right side in the direction of 7 from FIG. 4.
Figure 8:
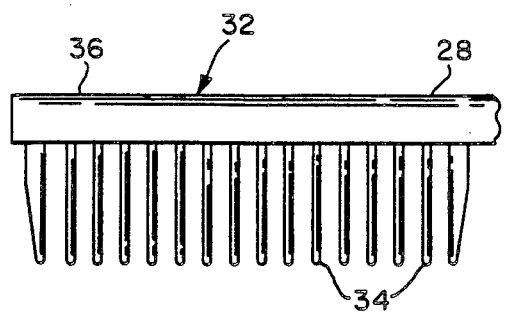
FIGS. 8 and 9 show fine and coarse replaceable combs which may be employed in the tool.

Referring to FIGS. 2-7, grooming tool 10 is tubular in shape with proximal end 16 inserted into or over the open end of vacuum hose 12. As best seen in FIGS. 3, 4, and 5, extending back from the distal end of tool 10 there is a flattened section 18 forming an elongated, slotted opening 22 along one edge of which is a shoulder 24 in which a groove 26 is formed acting as a clip to accommodate the thickened base, 36 of comb 32. The slotted opening 22 is formed in the flattened section 18 below shoulder 24 and extends transversely from the outer periphery of tool 10 as seen in FIG. 4.

By this arrangement it will be seen that teeth 34 of comb 32 extend transversely, that is, across the width of elongated, slotted opening 22 so that air being drawn into tool 10 through opening 22 will pass through teeth 34, and that the root of teeth 34 are immediately adjacent to opening 22, for most effective and efficient operation of tool 10 in carrying away hairs picked up by teeth 34 of comb 32.

Comb 32 is made up of a thickened base 36 for being snapped into groove 26, a top edge 28, and a tail or projection 38 which extends within and down the length of tool 10 in the direction of vacuum or evacuating tube 12. Projection 38 renders it easy and convenient to release comb 32 from groove 26 in the event due to the tightness of the fit it is difficult to pull comb 10 out using teeth 34. By reaching into the open, proximal end 16 of tool 10, comb 32 can be readily dislodged by pushing sideways on projection 38 which provides ample leverage.

Figure 9:
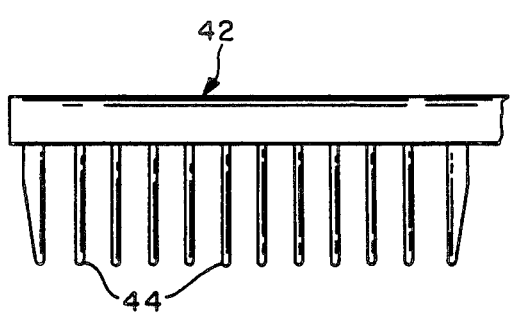

Since tool 10 is moved at right angles to the direction in which comb 10 is mounted, there is no problem that tool 10 will become loose or come out of groove 26 while in use, while at the same time it is easy and convenient to replace comb 10 with another one in which the teeth are finer or coarser as shown in FIG. 9 which shows a comb 42 with teeth 44 which are coarser than teeth 34 in comb 32.

Tool 10 is of one piece construction, except for comb 32, being typically made from a molded, rigid plastic. When used in the manner illustrated in FIG. 1, it is highly effective and efficient in removing hairs which come loose during grooming of the pet.

While only a certain preferred embodiment of this invention has been described it is understood that many variations of this invention are possible without departing from the principles of this invention as defined in the claims which follow.

What is claimed is:

1. Vacuum cleaning animal grooming apparatus comprising a source of a vacuum, a generally cylindrically shaped tool open at its proximal end for engagement with said vacuum source, the distal end of said tool being closed and flattened along one side for a distance from said distal end and having a slotted opening, a shoulder along one side of said slotted opening, said slotted opening extending along the flattened portion of said tool adjacent one side of said shoulder, an extended comb having a base from which teeth extend, means formed on the side of said shoulder facing said opening for supporting the base of said comb with said teeth extending across said slotted opening and passing out of said tool, said means for supporting the base of said comb comprising a groove accommodating the base of said comb by a tight fitting engagement, said comb thereby being detachably connected to said tool so that said comb can be readily removed and replaced, and a projection from said base extending within said tool in the direction of the proximal end thereof so that said comb can be dislodged from said groove by making contact with said projection through the open end of said tool.

2. The vacuum cleaning animal grooming apparatus of claim 1 in which said means for supporting the base of said comb comprises a groove for receiving the base of said comb, said comb thereby being detachably connected to said tool so that said comb can be readily removed and replaced.

3. The vacuum cleaning animal grooming apparatus of claim 2 in which said groove accommodates the base of said comb by a tight fitting engagement between said base and said groove.

4. The vacuum cleaning animal grooming apparatus of claim 1 which the root portion of said comb where said teeth are attached to the base of said comb is located directly in front of said slotted opening so that air entering said tool through said slotted opening passes between the teeth of said comb in the root area thereof.

5. Vacuum cleaning animal grooming apparatus comprising a source of a vacuum, a generally cylindrically shaped tool open at its proximal end for engagement with said vacuum source, the distal end of said tool being closed and flattened along one side for a distance from said distal end and having a slotted opening, a shoulder along one side of said slotted opening, said slotted opening extending along the flattened portion of said tool adjacent one side of said shoulder, an extended comb having a base from which teeth extend, means formed on the side of said shoulder facing said opening for supporting the base of said comb with said teeth extending across said slotted opening and passing out of said tool, said means for supporting the base of said comb comprising a groove accommodating the base of said comb by a tight fitting engagement, said comb thereby being detachably connected to said tool so that said comb can be readily removed and replaced, and a projection from said base extending within said tool in the direction of the proximal end thereof so that said comb can be dislodged from said groove by making contact with said projection through the open end of said tool.

* * * * *